(12) United States Patent
Takahashi

(10) Patent No.: US 9,969,083 B2
(45) Date of Patent: May 15, 2018

(54) CONTROL APPARATUS OF MOTOR

(71) Applicant: TOYOTA JIDOSHA KABUSHIKI KAISHA, Toyota-shi, Aichi-ken (JP)

(72) Inventor: Taro Takahashi, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days. days.

(21) Appl. No.: 15/223,605

(22) Filed: Jul. 29, 2016

(65) Prior Publication Data
US 2017/0043480 A1 Feb. 16, 2017

(30) Foreign Application Priority Data

Aug. 11, 2015 (JP) .................................. 2015-158898

(51) Int. Cl.
H02P 6/12 (2006.01)
B25J 9/16 (2006.01)

(52) U.S. Cl.
CPC .................................... B25J 9/1633 (2013.01)

(58) Field of Classification Search
CPC .............................. H02K 11/24; B25J 9/1633
See application file for complete search history.

(56) References Cited

U.S. PATENT DOCUMENTS

| 5,455,497 A | 10/1995 | Hirose et al. |
| 2009/0272585 A1 | 11/2009 | Nagasaka |
| 2015/0100159 A1* | 4/2015 | Park .......................... H02K 7/14 700/258 |
| 2015/0250547 A1 | 9/2015 | Fukushima et al. |

FOREIGN PATENT DOCUMENTS

| JP | H05-305584 A | 11/1993 |
| JP | H11-42573 A | 2/1999 |
| JP | 2000-050666 A | 2/2000 |
| JP | 4715863 B2 | 7/2011 |
| WO | 2015/046081 A1 | 4/2015 |

* cited by examiner

*Primary Examiner* — Karen Masih
(74) *Attorney, Agent, or Firm* — Oliff PLC

(57) ABSTRACT

A control apparatus of the motor according to one aspect includes: a first feedforward calculator configured to calculate a first motor output torque value so that a torque value indicated by a torque command signal can be generated in a joint part of a robot based on a model of a motor, a decelerator, or a link and the number of rotations of the motor, a second feedforward calculator configured to calculate a second motor output torque value based on the torque value indicated by the torque command signal without depending on the number of rotations of the motor; and a comparator configured to add the first motor output torque value, the second motor output torque value, and a third motor output torque value calculated based on the torque value detected by a sensor and the torque value indicated by the torque command signal.

1 Claim, 7 Drawing Sheets

CONTROL APPARATUS OF MOTOR

CROSS REFERENCE TO RELATED APPLICATION

This application is based upon and claims the benefit of priority from Japanese patent application No. 2015-158898, filed on Aug. 11, 2015, the disclosure of which is incorporated herein in its entirety by reference.

BACKGROUND OF THE INVENTION

1. Field of the Invention

The present invention relates to a control apparatus of a motor and more particularly, relates to a control apparatus that performs two-degree-of-freedom-control of a motor of a torque servo that drives links of a robot by a combination of a feedback control and a feed forward control.

2. Description of Related Art

Japanese Unexamined Patent Application Publication No. 2000-50666 discloses a technique in which a target value following property for a torque command value is improved using a two degree-of-freedom control.

Japanese Unexamined Patent Application Publication No. 11-42573 discloses a technique for calculating an output torque of a motor to achieve a target robot motion using a two degree-of-freedom control. However, the technique disclosed in Japanese Unexamined Patent Application Publication No. 11-42573 relates to a control of the whole robot and does not relate to a control of the motor for each joint part of the robot.

The technique disclosed in Japanese Unexamined Patent Application Publication No. 2000-50666 does not consider torque to rotate a motor or the like to obtain a reaction force when the robot contacts an environment in a feedforward calculator. It is therefore impossible to accurately control the output torque.

SUMMARY OF THE INVENTION

The present invention has been made in view of the aforementioned circumstances and aims to provide a control apparatus of a motor of a torque servo capable of accurately controlling an output torque.

A control apparatus of a motor according to one aspect of the present invention is a control apparatus of a motor that is applied to a robot including a joint part and a link, the joint part including a motor, a decelerator, and a sensor, the link being driven by the motor via the decelerator and receiving a reaction force from an environment, the control apparatus of the motor controlling the motor by a combination of a feedback control and a feedforward control, the control apparatus of the motor including:
  a first feedforward calculator configured to calculate a first motor output torque value so that a torque value indicated by a torque command signal can be generated in the joint part based on at least a model of the motor, the decelerator, or the link and the number of rotations of the motor,
  a second feedforward calculator configured to calculate a second motor output torque value based on the torque value indicated by the torque command signal without depending on the number of rotations of the motor; and
  a comparator configured to add the first motor output torque value, the second motor output torque value, and a third motor output torque value calculated based on the torque value detected by the sensor and the torque value indicated by the torque command signal.

According to the present invention, it is possible to obtain a control apparatus of a motor of a torque servo capable of accurately controlling an output torque.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

Hereinafter, with reference to the drawings, a specific embodiment of the present invention will be described in detail. It should be noted, however, that the present invention is not limited to the following embodiment. For the clarification of the description, the following description and the drawings are simplified as appropriate.

Figure 1:
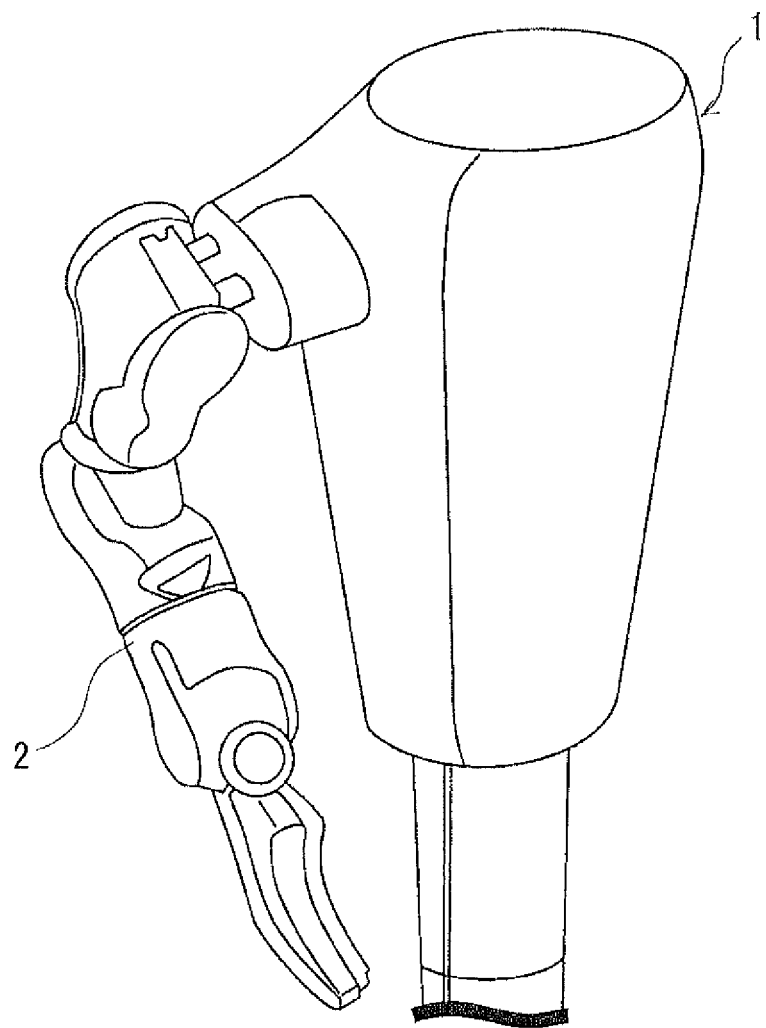
FIG. 1 is a schematic view showing a typical robot.
Figure 2:
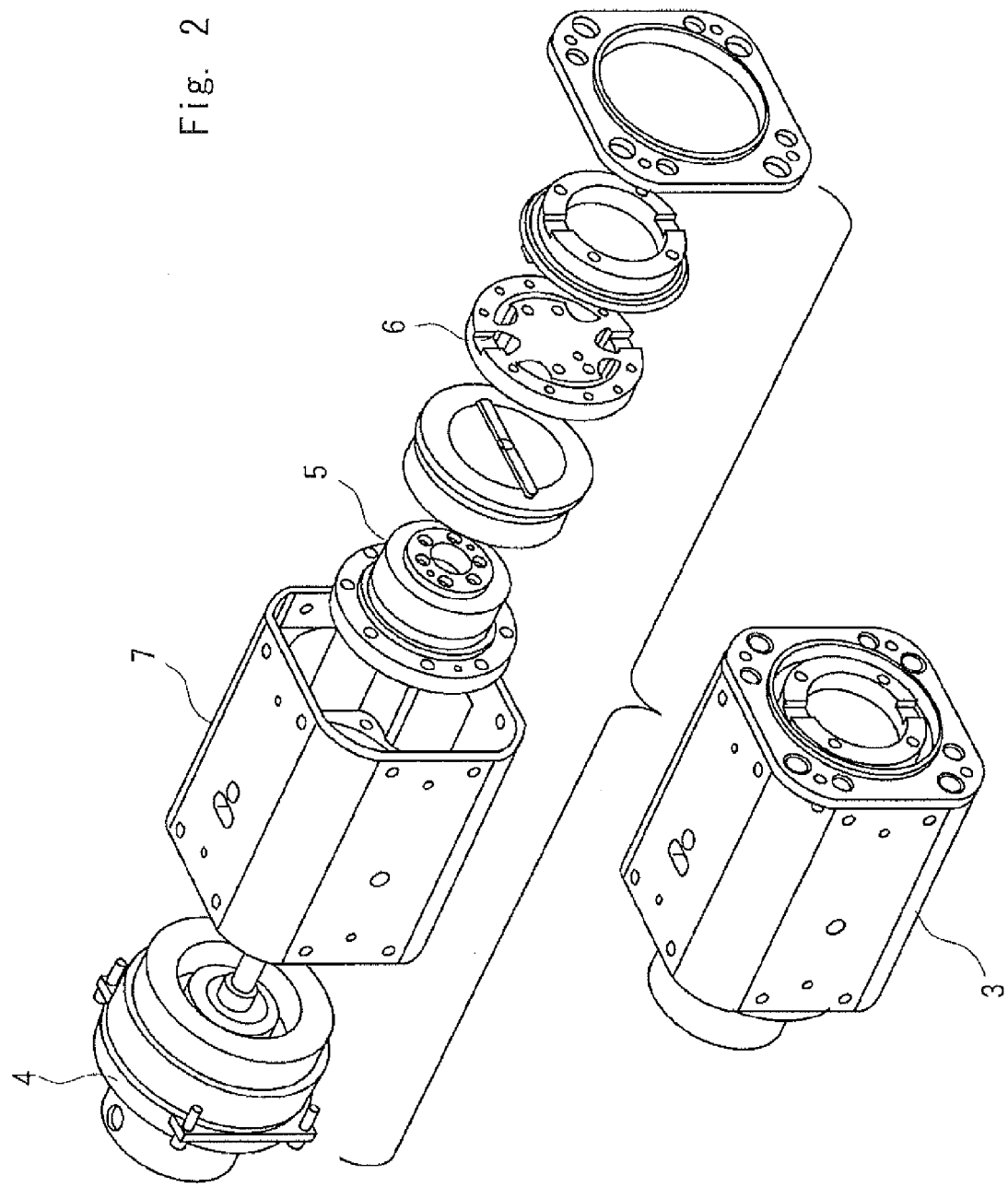
FIG. 2 is an exploded view showing a configuration of a torque servo mounted on the robot.
Figure 3:
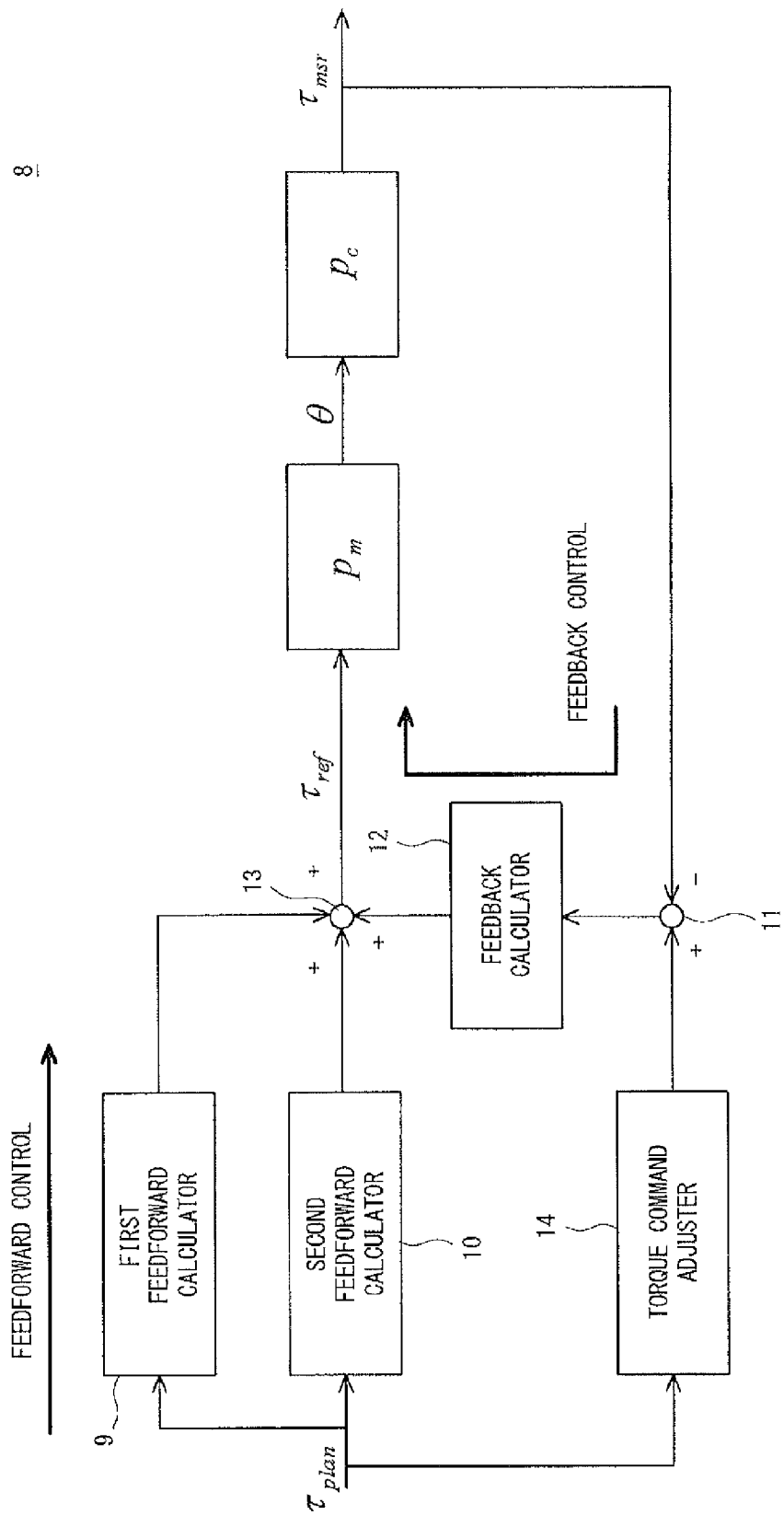
FIG. 3 is a block diagram showing a control apparatus of a motor according to an embodiment.
Figure 4:
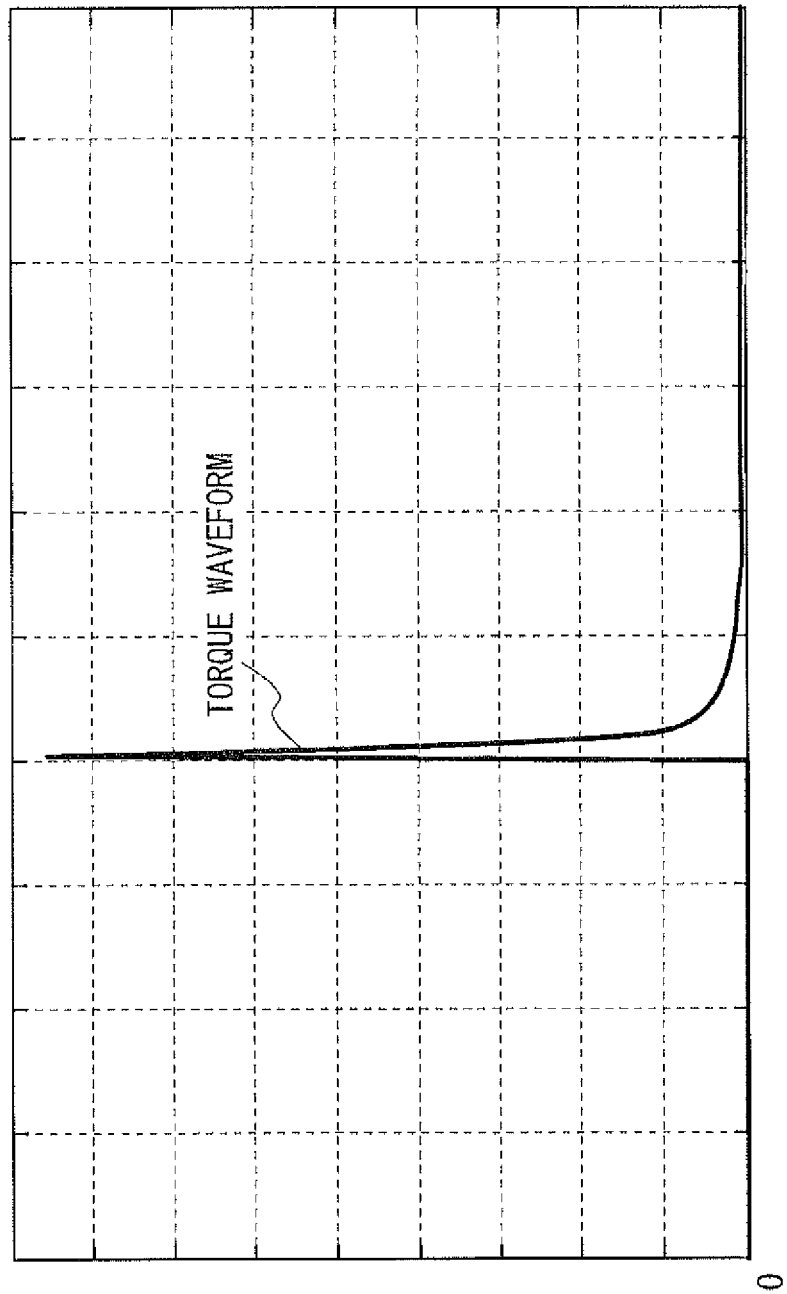
FIG. 4 is a diagram showing one example of a torque waveform of a first motor output torque value.
Figure 5:
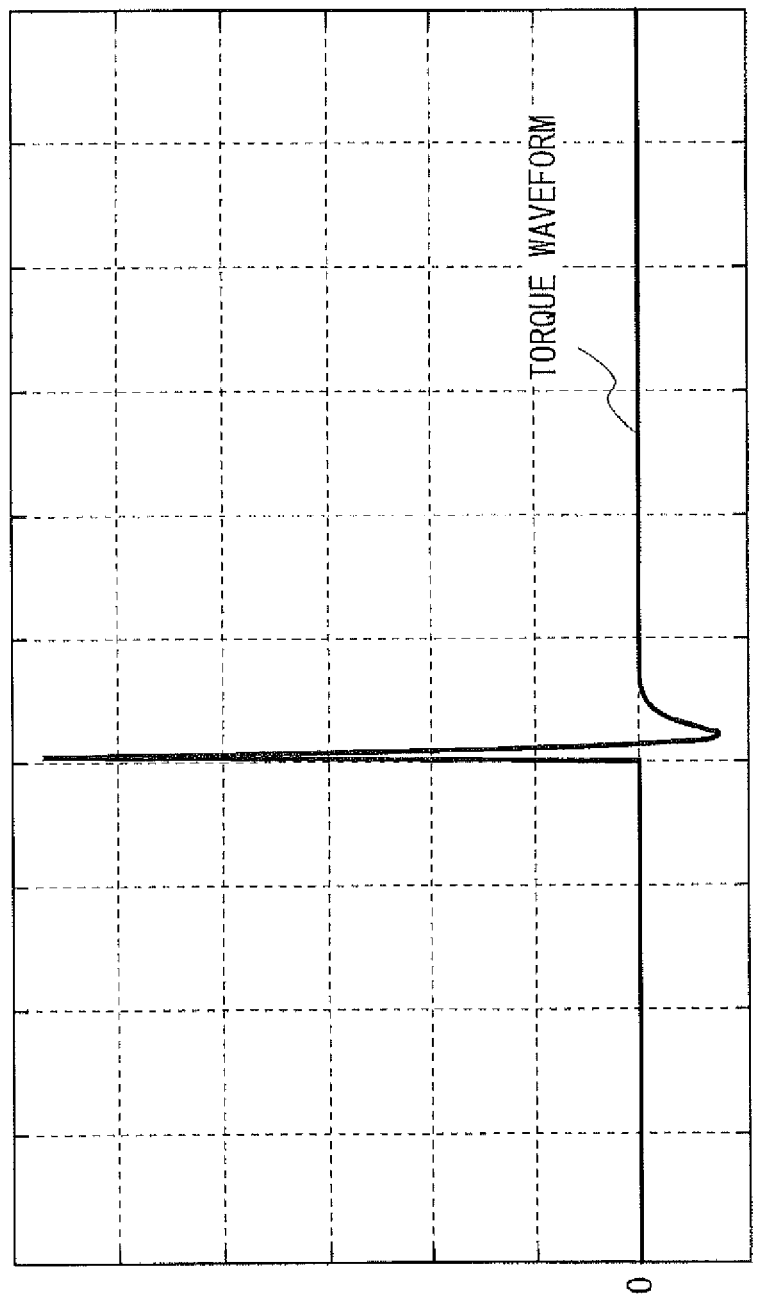
FIG. 5 is a diagram showing one example of a torque waveform in which an undershoot occurs.

FIG. 1 is a schematic view showing a typical robot arm. FIG. 2 is an exploded view showing a configuration of a torque servo mounted on the robot arm. FIG. 3 is a block diagram showing a control apparatus of a motor according to this embodiment. FIG. 4 is a diagram showing one example of a torque waveform of a first motor output torque value. FIG. 5 is a diagram showing one example of a torque waveform in which an undershoot occurs.

The control apparatus of the motor according to this embodiment (hereinafter it may be simply referred to as a control apparatus) performs a two-degree-of-freedom-control of a motor of a torque servo that drives links of the robot by a combination of a feedback control and a feedforward control. Such a control apparatus is suitably used to control, for example, the motor of the torque servo arranged in a joint part to drive a link 2 of a robot arm (robot) 1 as shown in FIG. 1.

As shown in FIG. 2, the torque servo 3 has a configuration, for example, in which a motor 4, a decelerator 5, a torque sensor 6 and the like are stored in a housing 7. A member that is provided between the motor 4 and the decelerator 5 is a coupling jig, although the reference numeral thereof is not shown in FIG. 2.

As shown in FIG. 3, a control apparatus 8 according to this embodiment includes a first feedforward calculator 9, a second feedforward calculator 10, a first comparator 11, a feedback calculator 12, and a second comparator 13.

The first feedforward calculator 9 is arranged in parallel with the second feedforward calculator 10. The first feedforward calculator 9 according to this embodiment mainly plays a role of accurately controlling an output torque with high following capability compared to a case in which only the second feedforward calculator 10 is provided when an output torque command value is changed while the robot arm 1 is in contact with the contact environment. Even while the robot arm 1 is not in contact with the contact environment, the first feedforward calculator 9 has an effect of improving the following property of the output torque and accurately controlling the output torque.

Such a first feedforward calculator 9 calculates a first motor output torque value to rotate (drive) a plant such as the link 2, the motor 4, the decelerator 5, and the like so that it becomes possible to generate a torque value $\tau_{plan}$ indicated by a torque command signal input from outside in the link 2 in a state in which the link 2 coupled to the torque servo 3 including the motor 4 is not in contact with the contact environment.

More specifically, with regard to the control object such as the motor 4, the decelerator 5, the link 2 and the like, a plant model $P_m$ from an input torque to a joint angle is defined as shown in the following <Expression 1>. This has a form equal to that of a typical model having a viscous friction and inertia of the motor 4 and is a model including inertia $J_n$ and a viscous friction B, of the entire controlled object such as the motor 4, the decelerator 5, the link 2 and the like. In the following <Expression 1> and the like, "s" denotes a Laplace operator, the product with s denotes a differentiation, and the product with 1/s denotes an integral.

$$P_m = \frac{1}{(J_n s + B_n)s}$$ [Expression 1]

Further, a model $P_c$ of a reaction force that is generated in the contact environment is defined as shown in the following <Expression 2>. This is a spring damper model defined by a spring constant $K_{en}$ and a viscosity coefficient $D_{en}$ and includes, besides the stiffness of the contact environment, the stiffness of the link 2, the decelerator 5 and the like. The spring constant $K_{en}$ can be set to an appropriate value and an error is absorbed by the feedback control.

$$P_c = K_{en} + D_{en} s$$ [Expression 2]

Further, a target value response $G_{ry}$ is defined by a second-order lag system as shown in the following <Expression 3>.

$$G_{ry} = \frac{1}{(1 + T_r s)^2}$$ [Expression 3]

While the target value response $G_{ry}$ is defined by the form of the product of a first-order low-pass filter of a time constant $T_r$, it is sufficient that the target value response $G_{ry}$ be a low-pass filter in which the order of the denominator is larger than the order of the numerator by two or more.

A first feedforward gain $FF_1$ that has been determined as the following <Expression 4> using the model $P_m$ of such a plant, the inverse system of the model $P_c$ of the reaction force, and the target value response $G_{ry}$ is set in the first feedforward calculator 9.

$$FF_1 = G_{ry} \cdot P_m^{-1} \cdot P_c^{-1}$$ [Expression 4]

The first feedforward calculator 9 multiplies a first feedforward gain $FF_1$ by a torque value $\tau_{plan}$ indicated by the torque command signal to calculate the first motor output torque value and outputs the signal indicating the first motor output torque value that has been calculated to the second comparator 13. That is, the first motor output torque value is calculated by multiplying the target value response $G_{ry}$, the inverse system of a nominal model such as the motor 4 and the like, and the inverse system of the nominal model of the contact environment.

The first feedforward gain $FF_1$ is obtained by calculating the rotation angle of the motor 4 that is required to generate the torque value indicated by the torque command signal (that is, the number of rotations) by an angle to achieve a pushing amount considering the stiffness of the environment, the stiffness of the link 2, and the stiffness of the decelerator 5 and further calculating the motor output torque value that is necessary to achieve the rotation of the motor 4 corresponding to the rotation angle. When the rotation angle of the motor 4 is 0, the motor output torque value also becomes 0.

There are two purposes for the target value response $G_{ry}$ being multiplied in <Expression 4>. The first purpose is to prevent vibrations of the robot arm 1. If the target value response $G_{ry}$ is not multiplied in <Expression 4>, a large torque value is instantaneously generated in the motor 4 when the torque value indicated by the torque command signal is suddenly changed, which may excite vibrations.

The second purpose is to make the order of the denominator (order of s) of the transfer function of the whole first feedforward gain $FF_1$ equal to or larger than the order of the numerator and facilitate discretization that is required to produce the software. When the control software of the amplifier of the motor 4 is manufactured, the whole first feedforward gain $FF_1$ needs to be discretized and coded. The discretization cannot be performed if the order of the denominator thereof does not satisfy the above range.

The first motor output torque value has a desired torque waveform depending on the parameters of the spring constant $K_{en}$ and the viscosity coefficient $D_{en}$. The first motor output torque value preferably has a torque waveform in which the motor 4 does not generate the torque, the direction of which is reverse to the direction of the torque generated by the motor 4 when the link 2 pushes the contact environment (in this embodiment, a torque waveform in which the undershoot at the falling edge does not occur as shown in FIG. 4 (that is, the torque value of the motor 4 does not become negative)). It is therefore possible to mitigate the effect that there is a lack of a generative force (output) when the stiffness of the contact environment is changed. FIG. 5 is a diagram showing the torque waveform in which the undershoot occurs.

While the first motor output torque value has been calculated by the first feedforward calculator 9, it does not include the torque command corresponding to the reaction torque of the torque generated by the contact force.

The second feedforward calculator 10 calculates a second motor output torque value to obtain the reaction force when the link 2 contacts the contact environment with the torque value $\tau_{plan}$ indicated by the torque command signal input from outside from the contact environment.

Therefore, a second feedforward gain $FF_2$ expressed by the following <Expression 5> is set in the second feedforward calculator 10. The second feedforward calculator 10 multiples the second feedforward gain $FF_2$ by the torque value $\tau_{plan}$ indicated by the torque command signal to calculate the second motor output torque value and outputs the signal indicating the second motor output torque value that has been calculated to the second comparator 13.

$$FF_2 = G_{ry}$$ [Expression 5]

In this embodiment, the target value response $G_{ry}$ is set as the second feedforward gain $FF_2$. Such a second feedforward calculator 10 plays a role of generating torque that is equal to the output torque command in a state in which the robot arm 1 is in contact with the contact environment.

Figure 6:
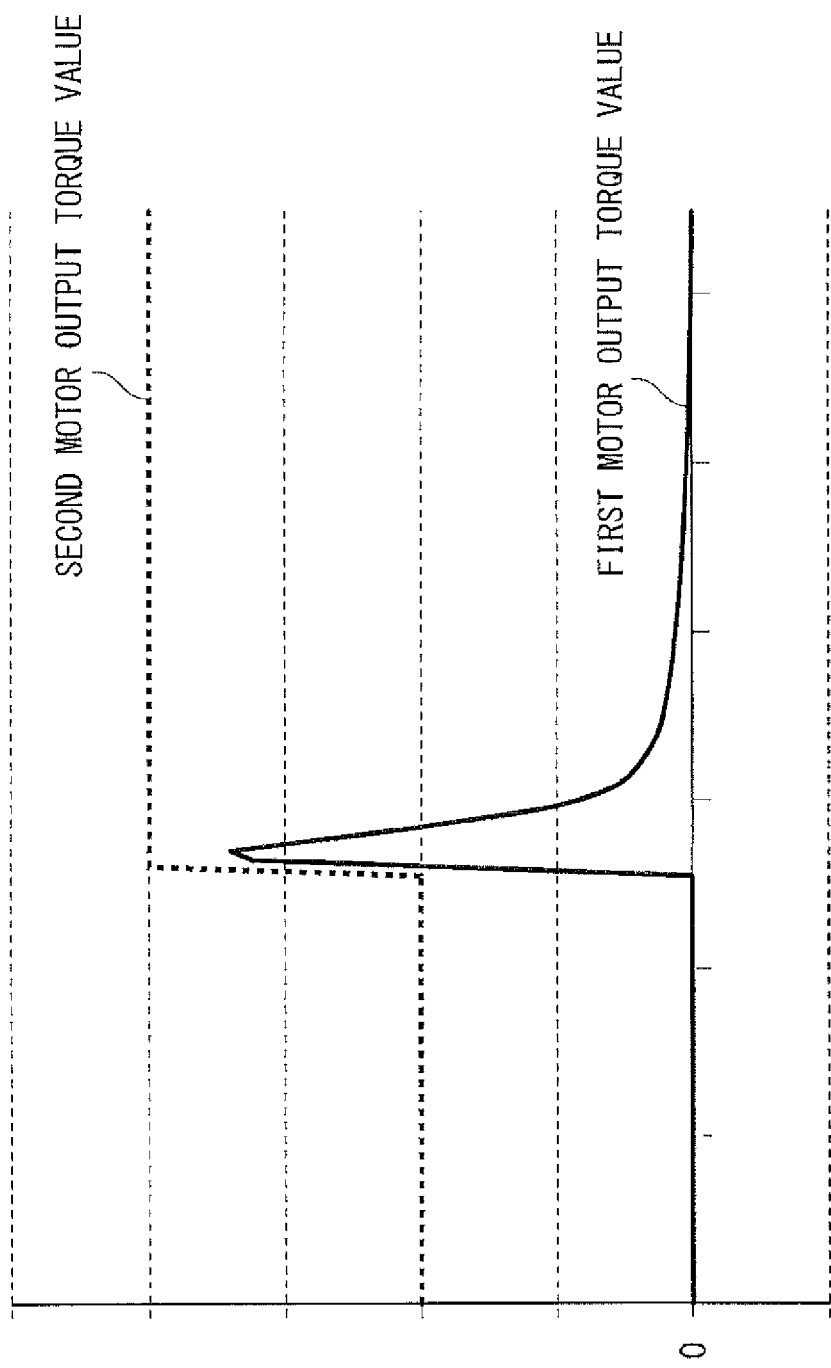
FIG. 6 is a diagram showing one example of torque waveforms of a first motor output torque value and a second motor output torque value.

FIG. 6 is a diagram showing one example of torque waveforms of the first motor output torque value and the second motor output torque value. When the toque value indicated by the torque command signal input to the first feedforward calculator 9 and the second feedforward calculator 10 is doubled in a stepped manner, the first motor output torque value and the second motor output torque value have, for example, the torque waveforms shown in FIG. 6.

The torque value obtained by adding the first motor output torque value and the second motor output torque value thus calculated is generated in the motor 4. It is thus possible to rotate the motor 4 in order to generate the torque value indicated by the torque command signal in the link 2 and to obtain the reaction force that is equal to the torque value.

It is impossible, however, for the model $P_m$ of the plant and the model $P_c$ of the reaction force to completely model the state of the contact environment and the actual motor 4 and there is a modeling error. Therefore, the performance of only the feedforward control using the first feedforward calculator 9 and the second feedforward calculator 10 causes an error.

The control apparatus 8 uses, besides the feedforward control, a feedback control. At this time, the control apparatus 8 preferably includes a torque command adjuster 14 so that a target value following property by the feedback control and a disturbance suppression property by the feedforward control can be designed independently from each other.

In the torque command adjuster 14, the target value response $G_{ry}$ is set as a coefficient to adjust the torque value $\tau_{plan}$ indicated by the torque command signal input from outside. The torque command adjuster 14 multiplies the torque value $\tau_{plan}$ indicated by the torque command signal by the target value response $G_{ry}$ and outputs the signal indicating the value obtained by multiplying the torque value $\tau_{plan}$ by the target value response $G_{ry}$ to the first comparator 11. However, the coefficient to adjust the torque value $\tau_{plan}$ can be set as appropriate according to the low-pass filter of the first feedforward calculator 9 and when the coefficient to adjust the torque value $\tau_{plan}$ is 1, the torque command adjuster 14 can be omitted.

The first comparator 11 calculates the deviation between the value obtained by multiplying the torque value $\tau_{plan}$ indicated by the signal input from the torque command adjuster 14 by the target value response $G_{ry}$ and a torque value $\tau_{msr}$ that is generated in the link 2 and is detected by the torque sensor 6 and outputs the signal indicating the deviation that has been calculated to the feedback calculator 12.

A feedback gain $K_p$ is set in the feedback calculator 12. The feedback calculator 12 then outputs a signal indicating a third motor output torque value obtained by multiplying the deviation indicated by the signal input from the first comparator 11 by the feedback gain $K_p$ to the second comparator 13. The feedback gain $K_p$ can be set as appropriate.

The second comparator 13 outputs a signal indicating a torque target value $\tau_{ref}$ obtained by adding the first motor output torque value indicated by the signal input from the first feedforward calculator 9, the second motor output torque value indicated by the signal input from the second feedforward calculator 10, and the third motor output torque value indicated by the signal input from the feedback calculator 12 to the motor 4. The motor 4 rotates at a rotation angle θ based on the signal indicating the torque target value $\tau_{ref}$ input from the second comparator 13.

In this embodiment, the first feedforward calculator 9 calculates the first motor output torque value using not only the model $P_m$ of the plant but also the model $P_c$ of the reaction force, whereby it is possible to accurately control the motor 4 in a state in which the robot arm 1 is in contact with the environment.

Further, since the systems of the model $P_m$ of the plant and the model $P_c$ of the reaction force and the inverse systems thereof cancel each other, it is expected that the response in accordance with the target value response $G_{ry}$ be eventually obtained.

Further, the first feedforward calculator 9 and the second feedforward calculator 10 can be separately designed, whereby it is possible to design the control apparatus 8 and to determine the parameters.

Further, when the order of the denominator of the target value response $G_{ry}$ is the second order and the target value response $G_{ry}$ can be expressed by the square of $(1+T_r s)$ or the polynomial of s, it is possible to prevent the number of parameters from being an enormous number and to suppress time required to design the control system.

Figure 7:
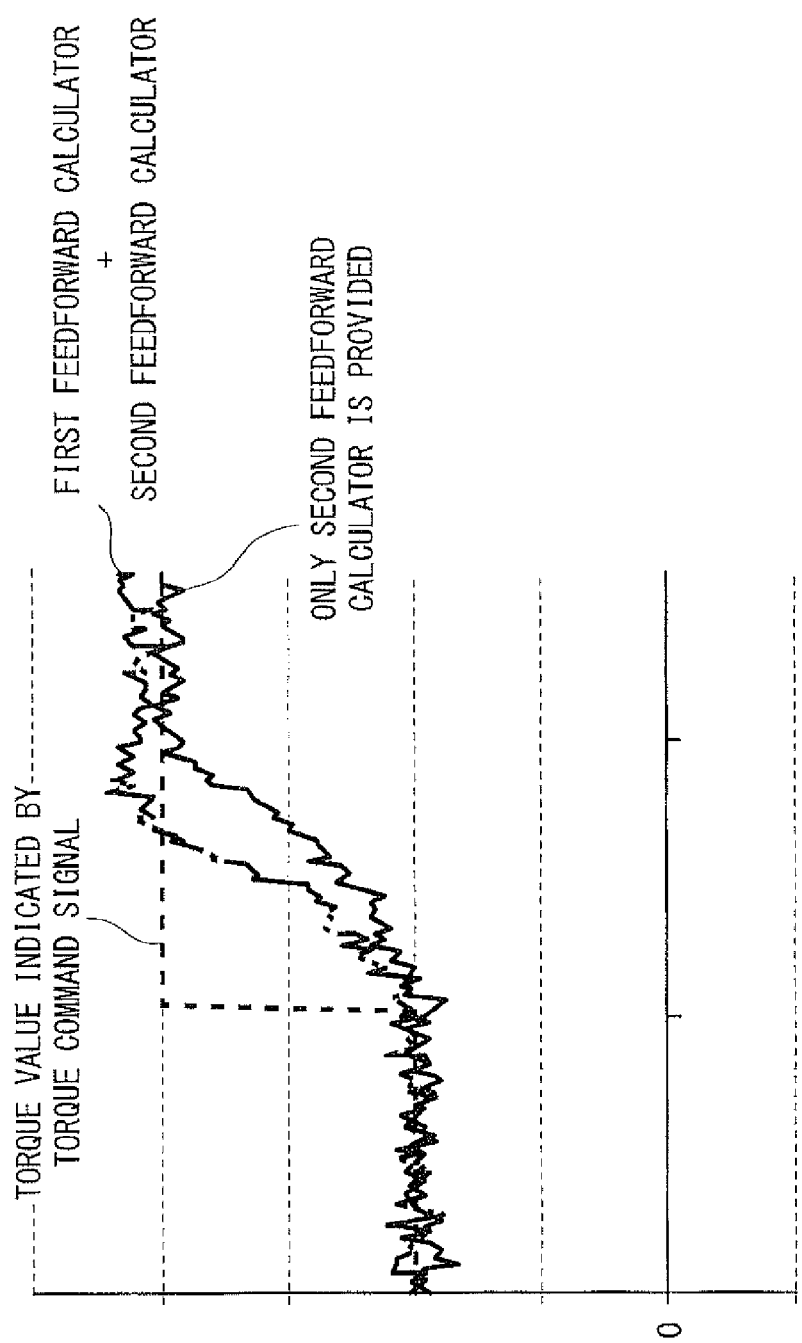
FIG. 7 is a diagram showing a following property to a torque value indicated by a torque command signal.

FIG. 7 is a diagram showing the following property to the torque value indicated by the torque command signal. As shown in FIG. 7, it will be understood that the control apparatus 8 according to this embodiment has a better following property to the torque value indicated by the torque command signal compared to the case in which the first feedforward calculator 9 is not provided in the control apparatus 8.

The present invention is not limited to the aforementioned embodiment and may be changed as appropriate without departing from the spirit of the present invention.

For example, while the case in which the robot arm 1 is in contact with the environment is described in the aforementioned embodiment, the present invention is not limited to this case. Even in a state in which the robot arm 1 is not in contact with the environment, a similar principle is established by replacing the contact force by an inertia force or the like generated by the acceleration of the link 2.

For example, while the case in which the link 2 rotates has been described in the aforementioned embodiment, the present invention is not limited to this case. Even when the link 2 linearly moves, a similar principle is established by replacing the torque by the force and replacing the angle by the position.

For example, the model of the contact environment is not limited to the one shown in <Expression 2> and may be $P_c = K_{en}$. In this case, the target value response $G_{ry}$ may be the one shown in <Expression 3> or may be $G_{ry} = 1/(1+T_r s)$. It is sufficient that the target value response $G_{ry}$ be a low-pass filter in which the order of the denominator is larger than the order of the numerator by one or more.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A control apparatus of a motor that is applied to a robot comprising a joint part and a link, the joint part comprising a motor, a decelerator, and a sensor, the link being driven by the motor via the decelerator and receiving a reaction force from an environment, the control apparatus of the motor controlling the motor by a combination of a feedback control and a feedforward control, the control apparatus of the motor comprising:

a first feedforward calculator configured to calculate a first motor output torque value so that a torque value indicated by a torque command signal can be generated in the joint part in a state in which the link is not in contact with the environment and that the motor does not generate torque, the direction of which is reverse to the direction of the torque generated by the motor when the link pushes the environment based on at least a model of the motor, the decelerator, or the link and the number of rotations of the motor;

a second feedforward calculator configured to calculate a second motor output torque value to obtain, from the environment, the reaction force when the link contacts the environment with the torque value indicated by the torque command signal;

a feedback calculation unit configured to multiply a deviation between a torque value generated in the link that has been detected and a value obtained by multiplying the torque value indicated by the torque command signal by a predetermined coefficient by a feedback gain to calculate a third motor output torque value; and a comparator configured to add the first motor output torque value, the second motor output torque value, and the third motor output torque value.

* * * * *